US011030819B1

(12) United States Patent
Martinez Ruvalcaba et al.

(10) Patent No.: US 11,030,819 B1
(45) Date of Patent: Jun. 8, 2021

(54) PRODUCT BUILD ASSISTANCE AND VERIFICATION

(71) Applicant: INTERNATIONAL BUSINESS MACHINES CORPORATION, Armonk, NY (US)

(72) Inventors: Marco Antonio Martinez Ruvalcaba, Jalisco (MX); Oscar Eduardo Gaeta Arellano, Guadalajara (MX); Sem Fernandez Ruiz, Jalisco (MX); Andres Eduardo Vázquez Pérez, Jalisco (MX); Ever Olivas Orduña, Guadalajara (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/699,769

(22) Filed: Dec. 2, 2019

(51) Int. Cl.
*G06T 19/00* (2011.01)
*G10L 15/22* (2006.01)
*G06F 3/16* (2006.01)
*G06K 9/62* (2006.01)
*G06F 3/01* (2006.01)

(52) U.S. Cl.
CPC ............ *G06T 19/006* (2013.01); *G06F 3/011* (2013.01); *G06F 3/167* (2013.01); *G06K 9/6267* (2013.01); *G10L 15/22* (2013.01); *G06T 2200/24* (2013.01); *G10L 2015/223* (2013.01)

(58) Field of Classification Search
CPC .................................................... G06T 19/006
See application file for complete search history.

(56) References Cited

U.S. PATENT DOCUMENTS

| 2012/0303336 A1* | 11/2012 | Becker ................ G01B 11/03 703/1 |
| 2013/0278635 A1 | 10/2013 | Maggiore |
| 2014/0240349 A1 | 8/2014 | Tuukkanen |

(Continued)

FOREIGN PATENT DOCUMENTS

| CN | 107122045 A | 9/2017 |
| CN | 107730591 A | 2/2018 |

OTHER PUBLICATIONS

Howden, "Industrial Augmented Reality", [accessed on Aug. 5, 2019], 6 pages, Retrieved from the Internet: <https://www.ptc.com/en/products/augmented-reality>.

(Continued)

*Primary Examiner* — Thomas J Lett
(74) *Attorney, Agent, or Firm* — Robert R. Aragona

(57) ABSTRACT

An embodiment of the invention may include a method, computer program product and computer system for product build assistance and verification. The method, computer program product and computer system may include computing device which may receive a product build order for a product and match the product build order to one or more recognition algorithms and one or more pieces of product artwork. The computing device may generate one or more build steps for product assembly and display a build step to a first user via a user interface on a mixed reality device. The computing device may analyze progress of the build step via the mixed reality device and generate a product build status update based on the progress of the build step. The computing device may display the status update to a second user on a second computing device.

20 Claims, 6 Drawing Sheets

(56) References Cited

U.S. PATENT DOCUMENTS

| | | | | |
|---|---|---|---|---|
| 2018/0060663 A1* | 3/2018 | Baskin | ................ | G06F 16/5838 |
| 2018/0082480 A1 | 3/2018 | White | | |
| 2018/0130260 A1* | 5/2018 | Schmirler | .......... | G06Q 10/0633 |
| 2018/0131907 A1* | 5/2018 | Schmirler | .......... | G05B 23/0216 |
| 2018/0336732 A1 | 11/2018 | Schuster | | |
| 2018/0350056 A1* | 12/2018 | Cardenas Bernal | .... | G06T 7/001 |
| 2019/0103037 A1* | 4/2019 | Lussier | .............. | G09B 19/0069 |
| 2020/0273253 A1* | 8/2020 | Jadallah | .................. | G06F 3/011 |

OTHER PUBLICATIONS

Mell et al., "The NIST Definition of Cloud Computing", National Institute of Standards and Technology, Special Publication 800-145, Sep. 2011, 7 pages.

Rodriguez, et al., "Developing a Mixed Reality Assistance System based on Projection Mapping Technology for Manual Operations at Assembly Workstations", Procedia Computer Science, 2015, pp. 327-333, Monterrey, MX.

Screen capture from YouTube video clip entitled "HoloLens Application on Premset", 3 page, Published on Feb. 22, 2017 by user Schneider Electric, Retrieved from the Internet: <https://www.youtube.com/watch?reload=9&v=RpXyagutoZg>.

Screen capture from YouTube video clip entitled "IoT Assistance in a Smart Factory using Microsoft HoloLens with Mixed Reality", 3 pages, published on Nov. 24, 2017 by user "CRAatHDA", retrieved from the internet: <https://www.youtube.com/watch?v=MeX8YWHhxfE>.

Screen captures from YouTube video clip entitles "Microsoft HoloLens: Collaborate with Microsoft Remote Assist to solve problems faster", 3 pages, published on May 7, 2018 by user "Microsoft HoloLens", retrieved from the internet: <https://www.youtube.com/watch?v=UpmoIMrf5HQ>.

* cited by examiner

US 11,030,819 B1

PRODUCT BUILD ASSISTANCE AND VERIFICATION

BACKGROUND

The present invention relates generally to a method, system, and computer program for product build assistance and verification. More particularly, the present invention relates to a method, system, and computer program for product build assistance and verification using a mixed reality device.

The manufacture and assembly of products, especially highly configurable products, requires a high degree of skill and training on the part of the people manufacturing and assembling the product. Often, people must go through intense training in order to learn how to manufacture and assemble just a single product, such as a car, requiring the retention of a lot of information.

BRIEF SUMMARY

An embodiment of the invention may include a method, computer program product and computer system for product build assistance and verification. The method, computer program product and computer system may include computing device which may receive a product build order for a product and match the product build order to one or more recognition algorithms and one or more pieces of product artwork. The computing device may generate one or more build steps for product assembly and display a build step to a first user via a user interface on a mixed reality device. The computing device may analyze progress of the build step via the mixed reality device and generate a product build status update based on the progress of the build step. The product build status update may include progression analytics. The computing device may display the status update to a second user on a second computing device. The computing device may receive a user request from the first user for assistance with the build step, the user request being generated via audio input to the mixed reality device and analyze the user request for assistance utilizing voice recognition. The computing device may display build step assembly guidance to the first user via the user interface on the mixed reality device. The computing device may verify the product is correctly assembled according to the build step and in response to verifying the product is not correctly assembled according to the build step, the computing device may generate a notification to the first user. The notification may indicate the build step was completed incorrectly.

BRIEF DESCRIPTION OF THE DRAWINGS

FIG. 1b illustrates example operating modules of the product build assistance and verification program of FIG. 1a.

DETAILED DESCRIPTION

Figure 1A:
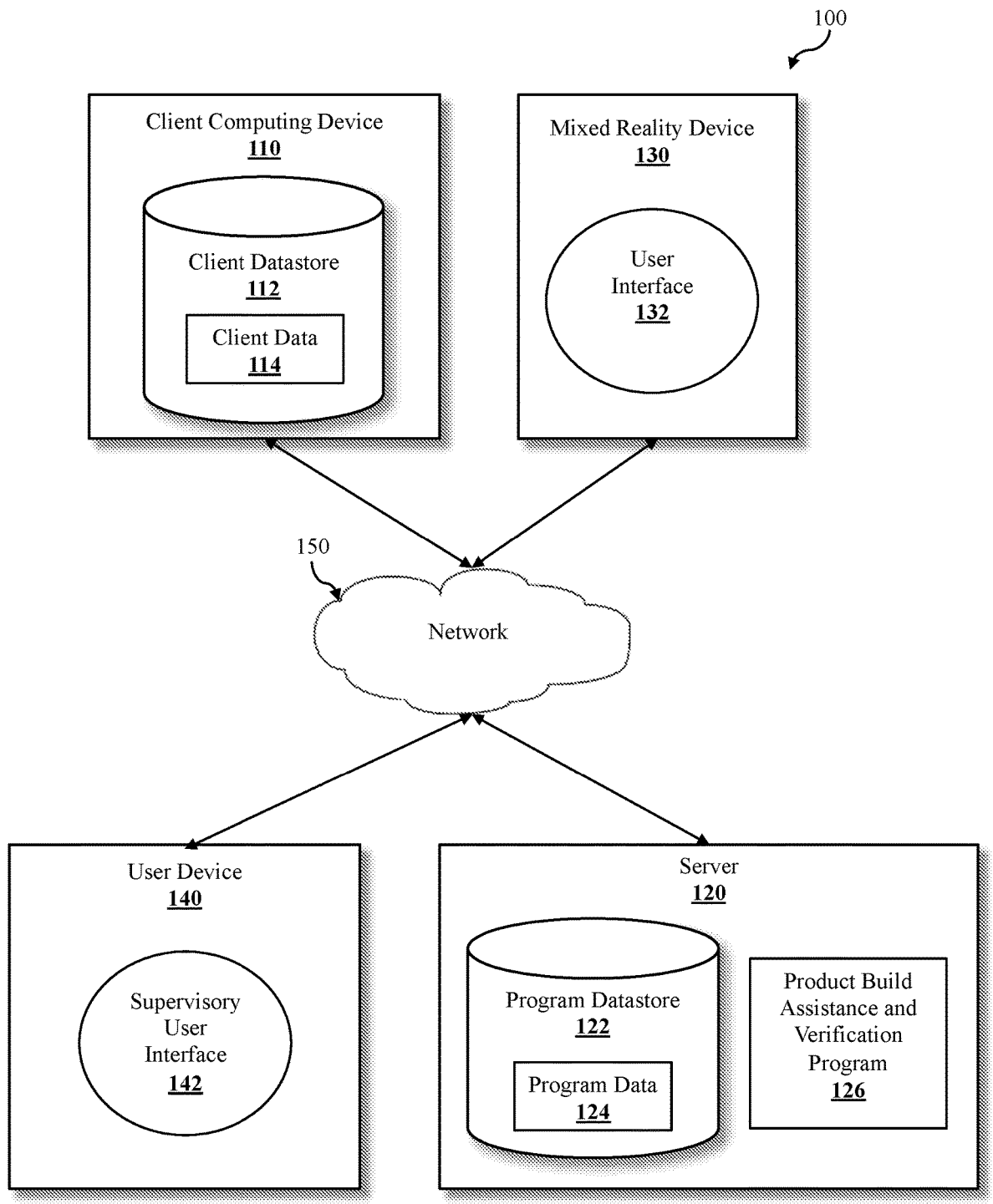
FIG. 1a illustrates a system for product build assistance and verification, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for product build assistance and verification. More particularly, embodiments of the present invention may receive a product build order and then generate product build steps associated with recognition algorithms and product assembly artwork. Further, embodiments of the present invention may display the product build steps to a user and monitor the user's progress via a mixed reality device, such as, but not limited to, mixed reality glasses (also referred to as augmented reality glasses). Thus, embodiments of the present invention provide hands-free product build instructions and supervision, so users do not need to use hand gestures or physically interact with the system to view or determine which build step they are in. Embodiments of the invention may also provide real-time assistance to the users and image processing to monitor and verify the product build steps. For example, if a user is not sure about something during the product build process, the inventive embodiments allow the user to contact an expert for help or access more detailed product build instructions using the mixed reality device. Also, embodiments of the present invention may generate product build status updates based on the image processing to track product build progress. Current technology relating to the product manufacture of do not provide a hand-free solution for generating and displaying product build steps using mixed reality technology. Current technology mostly relies upon human training and information retention. Thus, current product manufacture and assembly processes are vulnerable to human errors causing quality issues and production delays. Therefore, advantages of the present invention include hands-free product build assistance utilizing mixed reality (also referred to as augmented reality) technology for product build technology support and assistance. Further advantages of the present invention include image processing via mixed reality technology to monitor and verify a product build process.

Reference will now be made in detail to the embodiments of the present invention, examples of which are illustrated in the accompanying drawings, wherein like reference numerals refer to like elements throughout. Embodiments of the invention are generally directed to a system for image classification and masking.

FIG. 1 illustrates a product build assistance and verification system 100, in accordance with an embodiment of the invention. In an example embodiment, product build assistance and verification system 100 includes a client computing device 110, a server 120, a mixed reality device 130, and a user device 140, interconnected via a network 150.

In the example embodiment, the network 150 is the Internet, representing a worldwide collection of networks and gateways to support communications between devices connected to the Internet. The network 150 may include, for example, wired, wireless or fiber optic connections. In other embodiments, the network 150 may be implemented as an intranet, a local area network (LAN), or a wide area network (WAN), or a wired or wireless personal area network (PAN). In general, the network 150 can be any combination of connections and protocols that will support communications between the client computing device 110, the server 120, the mixed reality device 130, and the user device 140.

The client computing device 110 may include the client datastore 112. In the example embodiment, the client computing device 110 may be a desktop computer, a notebook, a laptop computer, a tablet computer, a thin client, or any other electronic device or computing system capable of storing, compiling, and organizing audio, visual, or textual content and receiving and sending that content to and from other computing devices, such as the server 120, the mixed reality device 130, and the user device 140 via network 150. While only a single client computing device 110 is depicted, it can be appreciated that any number of client computing devices 110 may be part of the product build assistance and verification system 100. In some embodiments, the client computing device 110 includes a collection of devices, or data sources, in order to store, compile, and organize the client data 114. The client computing device 110 is described in more detail with reference to FIG. 3.

The client datastore 112 may store the client data 114. The client datastore 112 may be any storage media capable of storing data, such as, but not limited to, storage media resident in the client computing device 110 and/or removeable storage media. For example, the client datastore 112 may be, but is not limited to, a hard drive, a solid stated drive, a USB drive, or a memory card, etc. In various embodiments, all or part of the client datastore 112 may be installed and run on the client computing device 110. The client datastore 112 is described in more detail with reference to FIG. 3.

The client data 114 may be a collection of audiovisual content including, but not limited to, audio, visual, and textual content. The client data 114 may be, for example, product information, product order data, and product assembly data. Product information may include, but is not limited to, product name, product inventory data, product serial number, product certifications, and product licenses, etc. Product order data may include, but is not limited to, order number, product manufacturer, and product quantity, product urgency, product assembly deadline, etc. Product assembly data may include, but it not limited to, product features list, product component list, product assembly artwork, product assembly instructions, and product assembly algorithms, etc. The client data 114 is located on the client computing device 110 and may be accessed via the network 150. In accordance with an embodiment of the invention, the client data 114 may be located on one or a plurality of client computing devices 110.

The server 120 may include the program datastore 122 and the product build assistance and verification program 126. In the example embodiment, the server 120 may be a desktop computer, a notebook, a laptop computer, a tablet computer, a thin client, or any other electronic device or computing system capable of storing, compiling, and organizing audio, visual, or textual content and receiving and sending that content to and from other computing devices, such as the client computing device 110, the mixed reality device 130, and the user device 140 via network 150. In some embodiments, the server 120 includes a collection of devices, or data sources, in order to store, compile, and organize the program data 124. The server 120 is described in more detail with reference to FIG. 3.

The program datastore 122 may store the program data 124. The program datastore 122 may be any storage media capable of storing data, such as, but not limited to, storage media resident in the server 120 and/or removeable storage media. For example, the program datastore 122 may be, but is not limited to, a hard drive, a solid stated drive, a USB drive, or a memory card, etc. In various embodiments, all or part of the program datastore 122 may be installed and run on the server 120. The program datastore 122 is described in more detail above and with reference to FIG. 3.

The program data 124 may be a collection of audiovisual content including, but not limited to, audio, visual, and textual content. The program data 124 may include, for example, the client data 114 received and/or collected from the client computing device 110. Further, the program data 124 may include product assembly status data, image and/or video data captured by the mixed reality device 130, audio data captured by the mixed reality device 130, and user data, etc. Product Assembly status data may include, but is not limited to, percentage completion for individual product build steps, percentage completion for complete product build, time taken for each product build step, time take for complete product build, percentage overall order completion status, and time take for overall order completion status, etc. User data may include but is not limited to, user productivity metrics, e.g. product assembly status data per worker. The program data 124 is located on the server 120 and may be accessed via the network 150. In accordance with an embodiment of the invention, the program data 124 may be located on one or a plurality of servers 120.

The product build assistance and verification program 126 is a program capable of receiving a product order, i.e. the client data 114, from the client computing device 110 and generating build steps and instructions for client product assembly. The product build assistance and verification program 126 may display the generated build steps and instructions for client product assembly to a user on the mixed reality device 130. Embodiments of the product build assistance and verification program 126 may monitor the status of the product assembly steps and overall product order and transmit the status information to a supervisor on another device such as the user device 140. Embodiments of the product build assistance and verification program 126 may receive user requests for product build step assistance via the mixed reality device 130 and provide detailed build step assembly instructions to the user via the mixed reality device 130. Further, embodiments of the product build assistance and verification program 126 may verify the correct assembly of the product at each product build step and overall correct product assembly. The product build assistance and verification program 126 is described in more detail below with reference to FIG. 1*b*.

The mixed reality device 130 may include the user interface 132. In some embodiments, the mixed reality device 130 may be a wearable device. In the example embodiment, the mixed reality device 130 may be mixed (or augmented) reality glasses, a mixed reality headset, a mixed reality projector, a notebook, a laptop computer, a tablet computer, a thin client, or any other electronic device or computing system capable of mixed reality display. The mixed reality device 130 may be capable of storing, compiling, organizing, and/or displaying audio, visual, or textual content and receiving and sending that content to and from other computing devices, such as the client computing device 110, the server 120, and the user device 140 via network 150. In some embodiments, the mixed reality device 130 includes a collection of devices, or data sources, in order to store, compile, organize, and/or display the program data 124. While only a single mixed reality device 130 is depicted, it can be appreciated that any number of mixed reality devices 130 may be part of the product build assistance and verification system 100

The user interface 132 includes components used to receive input from a user on the mixed reality device 130 and transmit the input to the product build assistance and verification program 126 residing on the server 120, or conversely to receive information from the product build assistance and verification program 126 and display the information to the user on mixed reality device 130. In an example embodiment, the user interface 132 uses a combination of technologies and devices, such as device drivers, to provide a platform to enable users of the mixed reality device 130 to interact with the product build assistance and verification program 126. In the example embodiment, the user interface 132 receives input, such as but not limited to, textual, visual, or audio input received from a physical input device, such as but not limited to, a camera, and/or a microphone. In various embodiments, multiple mixed reality devices 130 may be provided for each one of a corresponding number of multiple users.

The user device 140 may include the supervisory user interface 142. In the example embodiment, the user device 140 may be a mixed reality device, cellphone, desktop computer, a notebook, a laptop computer, a tablet computer, a thin client, or any other electronic device or computing system capable of storing, compiling, and organizing audio, visual, or textual content, such as the client data 114 and the program data 124, and receiving and sending that content to and from other computing devices, such as the client computing device 110, the server device 120, and the mixed reality device 130 via the network 150. While only a single user device 140 is depicted, it can be appreciated that any number of user devices 140 may be part of the product build assistance and verification system 100. In some embodiments, the user device 140 may include a collection of devices or data sources. While the user device 140 is depicted as separate from the server 120, it can be appreciated that the user device 140 and the server 120 may be the same device. The user device 140 is described in more detail with reference to FIG. 3.

The supervisory user interface 142 includes components used to receive input from a user on the user device 140 and transmit the input to the product build assistance and verification program 126 residing on the server 120, or conversely to receive information from the product build assistance and verification program 126 and display the information to the user on user device 140. In an example embodiment, the supervisory user interface 142 uses a combination of technologies and devices, such as device drivers, to provide a platform to enable users of the user device 140 to interact with the product build assistance and verification program 126. In the example embodiment, the supervisory user interface 142 receives input, such as but not limited to, textual, visual, or audio input received from a physical input device, such as but not limited to, a keypad, a mouse, a touchscreen, and/or a microphone.

Figure 1B:
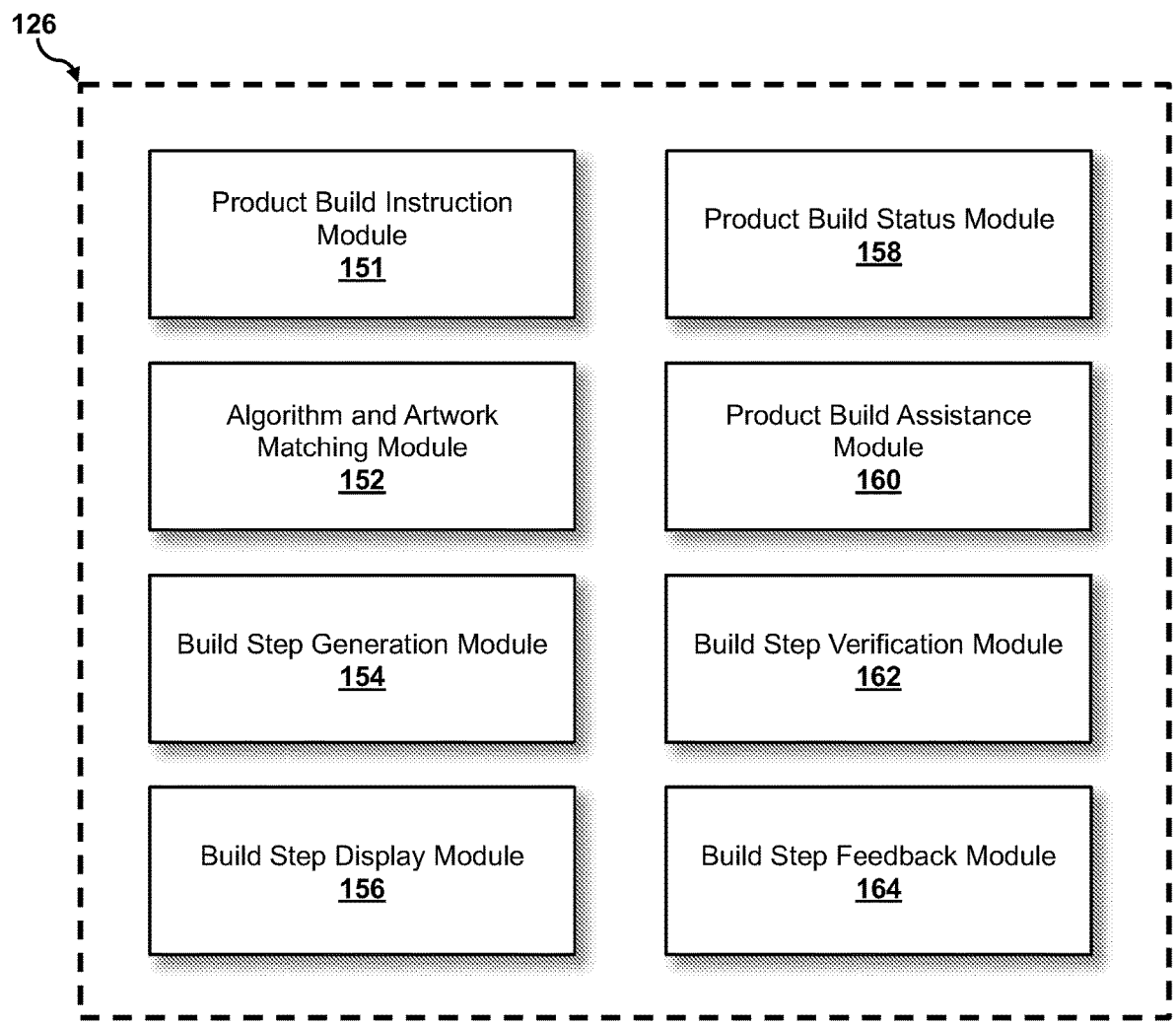

FIG. 1*b* illustrates example modules of the product build assistance and verification program 126. In an example embodiment, the product build assistance and verification program 136 may include eight modules: product build instruction module 151 algorithm and artwork matching module 152, build step generation module 154, build step display module 156, product build status module 158, product build assistance module 160, build step verification module 162, and build step feedback module 164.

The product build instruction module 151 receives a product build order. The product build order may be contained within the client data 114 and may be received by the product build instruction module 151 from the client computing device 110 via the network 150. In other embodiments of the invention, the product build order may be received by the product build instruction module 151 for example, but not limited to, via manual input into the product build assistance and verification program 126. Once the product build order is received by the product build instruction module, the product build order may be stored on the server 120 as part of the program data 124. The product build order may contain product order information including, but not limited to, order number, product manufacturer, and product quantity, product urgency, product assembly deadline, product features list, product component list, product assembly artwork, product assembly instructions, and product assembly recognition algorithms, etc. It will be appreciated that a "product" may be any physical item having at least two components and that requires assembly. It is not required that the physical item being assembled is done so for subsequent sale.

The algorithm and artwork matching module 152 matches the product build order to recognition algorithms and artwork. The recognition algorithms and artwork may be stored on the server 120 as part of the program data 124. For example, the product may be a product that has been previously built using the product build assistance and verification program 126. Alternatively, the recognition algorithms and artwork may be transmitted to the server 120 as part of the product build order, e.g. the client data 114. The algorithm and artwork matching module 152 matches the product build order to recognition algorithms and artwork for each component of the product to be built. The artwork may be assembly illustrations of each of the components of the product and may be for example, but not limited to, 3-dimensional, or 2-dimensional illustrations. Further, the artwork may be assembly illustrations capable of being displayed by the product build assistance and verification program 126 to a worker via the mixed reality device 130. For example, the product may have five different components and the algorithm and artwork matching module 152 may match each of the five components to a piece of artwork which illustrates how that component is assembled. The recognition algorithms may be any image recognition technology such as, but not limited to, deep learning algorithms, and/or a deep neural network, e.g. a deep convolutional neural network. Deep convolutional neural networks are a class of deep, feed-forward artificial neural networks consisting of an input layer, an output layer, and multiple hidden layers used to analyze images. An example image recognition technology utilized by the algorithm and artwork matching module 152 may be, but is not limited to, the IBM Watson™ Visual Recognition Service which uses deep learning algorithms to analyze images for scenes, objects, and other content. Further, the recognition algorithms may be refined utilizing images from previous product builds of the same product. For example, a client may place multiple product orders over a period of time to a single manufacturer and any images captured from the first product build may be used to further train or enhance the recognition algorithms associated with that product.

The build step generation module 154 generates a list of build steps for the product. Each build step may be associated with the artwork and recognition algorithm for the component being built at each step. Further the build steps may include assembly instructions for the component being built. For example, the product being built may be a chair and the build step generation module 154 may generate a list of build steps such as, but not limited to, attaching the legs to the chair seat, attaching the back to the chair seat, attaching the arms to the chair seat, and upholstering the chair. Continuing with the above example, for the first build step of attaching the legs to the chair seat, the build step generation module 154 may include artwork depicting the how the legs are attached, a recognition algorithm so the product build assistance and verification program 126 may analyze the build step, and instructions for how to attach the legs to the chair such as which tools are required, how many fasteners to use, what type of fasteners to use, where to place the fasteners, and how to secure the fasteners, etc. In an exemplary embodiment of the invention, the build steps generated by the build step generation module 154 are formatted for display on the mixed reality device 130. Thus, the build step generation module 154 generates build steps that will be displayed to a user and not require the user to use their hands to interact with the build steps, like the user would if they were using a manual or another physical device such as a computer or tablet to view the build steps.

The build step display module 156 displays each build step to a worker on the mixed reality device 130 via the user interface 132. The build step display module 156 may display the artwork and instructions associated with the build step being displayed to the worker on the mixed reality device 130 via the user interface 132. For example, but not limited to, the mixed reality device 130 may be mixed reality glasses worn by a worker and the build step display module 156 may display the build step such that the worker may view the build step artwork and instructions in an augmented reality environment without obstructing the worker's view of their workspace. For example, the build step artwork and instructions may be displayed on the mixed reality device 130 such that the artwork appears in the worker's right periphery vision and the instructions appear in the worker's left periphery vision. Thus, the worker's center field of vision is left clear for the worker to view the worker's workspace. As stated above, the build step display module 156 displays each build step to the worker such that the worker may view each step without needing to use their hands to interact with the system; therefore, allowing hands-free product build instruction. Further, it can be appreciated that the product may be built in an assembly line and the build step display module 156 may display each build step from the generated list of build steps to a different worker using a different mixed reality device 130. Continuing with the example of the chair above, each of the build steps may be sent to a different worker such that a first mixed reality device 130 displays the build step of attaching the legs to the chair seat to a first worker, a second mixed reality device 130 displays the build step of attaching the back to the chair seat to a second worker, a third mixed reality device 130 displays the build step of attaching the arms to the chair seat to a third worker, and a fourth mixed reality device 130 displays the build step of upholstering the chair to a fourth worker.

The product build status module 158 analyzes the build step progress and generates a status update of the product build. The product build status module 158 analyzes the build step progress via the mixed reality device 130 utilizing image recognition technology such as, but not limited to, recognition algorithms, e.g. IBM Watson™ Visual Recognition Service. The image recognition technology allows the mixed reality device 130 to collect images and/or video of the product build and compare those images and/or video to the product artwork of the build step. Thus, the build status module 158 may generate a product build status that includes, but is not limited to, percentage completion for individual product build steps, percentage completion for complete product build, time taken for each product build step, time taken for complete product build, percentage overall order completion status, and time take for overall order completion status, worker identification, worker build step assignment, and individual worker productivity metrics, etc. The product build status may include a graph, a chart, or any other visual representation of the product build status information. In an embodiment of the invention, the status update generation may be initiated by the user device 140. For example, a supervisor utilizing mixed reality glasses, e.g. the user device 140, may look around a factory floor and as the supervisor focuses on an individual worker, the build status module 158 may analyze the build step progress via the mixed reality device 130 associated with the worker in focus and generate a status update associated with the worker in focus. The product build status module 158 may then display the status update on the user device 140 via the supervisory user interface 142. In an embodiment of the invention, the user device 140 may be mixed reality glasses worn by a supervisor and the build status module 158 may display the status update via the supervisory user interface 142. In an embodiment of the invention, the product build status module 158 may display the status on the user device 140 based on the focus of the user device 140. For example, a supervisor utilizing mixed reality glasses, e.g. the user device 140, may look around a factory floor and as the supervisor focuses on an individual worker, the build status module 158 may display the status update associated with the worker in focus.

The product build assistance module 160 receives a user request for assistance with a build step via the mixed reality device 130. The product build assistance module 160 may receive the user request for assistance from the mixed reality device 130 via the user interface 132. In an example embodiment, the user request may be an audio request which may be detected by the mixed reality device 130 via an input device such as, but not limited to, a microphone. The user request may be voice command phrases such as but not limited to, "Substitutes available for Item X", "Suspend installation for break", "How to install x component X", etc. The product build assistance module 160 may process the received user request utilizing a voice recognition application program interface (API) such as, but not limited to, IBM Watson™ Virtual Agent. The product build assistance module 160 analyzes the user request for assistance with a build step and displays build step assembly guidance to the user of the mixed reality device 130 via the user interface 132. The build step assembly guidance may include, but is not limited to, a virtual connection to an expert who may provide voice instruction to the user, detailed animated instructions of how to complete the build step, video of how to complete the build step, and/or detailed written instructions on how to complete the build step, etc. Thus, the product build assistance module 160 provides hands free interaction with the product build assistance and verification program 126.

The build step verification module 162 verifies the product is assembled according to the build step via the mixed reality device 130. The build step verification module 162 may capture an image of the product being assembled via the mixed reality device 130 and compare that image to the artwork for the build step to determine if the product has been assembled correctly. The build step verification module 162 may verify the product is assembled according to the build step using image recognition technology as discussed above with reference to the algorithm and artwork matching module 152. As discussed above, the image recognition technology may be, but is not limited to, recognition algorithms, deep learning algorithms, and/or a deep neural network, e.g. a deep convolutional neural network. Deep convolutional neural networks are a class of deep, feed-forward artificial neural networks consisting of an input layer, an output layer, and multiple hidden layers used to analyze images. An example image recognition technology utilized by the build step verification module 162 may be, but is not limited to, the IBM Watson™ Visual Recognition Service which uses deep learning algorithms to analyze images for scenes, objects, and other content. In embodiments of the invention, the build step verification module 162 may, for example, but not limited to, run constantly in the background throughout the product assembly, or run at pre-defined intervals to capture images of the product assembly. For example, the build step verification module 162 may capture images of the product assembly every 30 seconds, every minute, or every 5 minutes, etc. Therefore, the build step verification module 162 is capable of verifying the correct installation and placement of the components of the product. In other embodiments of the invention, the build step verification module 162 may be voice-activated by a user of the mixed reality device 130. For example, a user may say "Check installation of component" and the build step verification module 162 would verify the component installation using the image recognition technology. Further, the build step verification module 162 may verify that the product components being used to build the product conform to the artwork, e.g. the components contain no defects, using image recognition technology as discussed above with reference to the algorithm and artwork matching module 152. For example, the build step verification module 162 may capture an image of the product being assembled via the mixed reality device 130 and compare that image to the artwork for the build step to determine if the product components conform to the components illustrated in the artwork.

The build step feedback module 164 generates a notification to the user if the build step has been completed incorrectly. The build step feedback module 164 may display the notification to the user via the user interface 132 on the mixed reality device 130. In embodiments of the invention the build step feedback module 164 may include an explanation of how the build step was completed incorrectly. For example, a worker executing a build step of installing legs on a chair seat may mistakenly place the back legs on the front of the seat and the build step verification module 162 may detect the mistake and the build step feedback module 164 may generate a notification to the worker which states "back legs installed incorrectly as front legs." Further, the notification may include the artwork for the build step and the artwork may be augmented to show the worker error. Continuing with the previous example, the build step feedback module 164 may include the artwork associated with installing the legs on the chair seat and may for example, but not limited to, color, highlight, or otherwise indicate the correct placement of the legs on the artwork. Further, the build step feedback module 164 may generate a notification to the user if the build step verification module 162 detects a product component is non-conforming to the product artwork. For example, a worker executing a build step of installing legs may attempt to install a back leg which has been bent, e.g. is defective, and the build step verification module 162 may detect the non-conforming component and the build step feedback module 164 may generate a notification to the worker which states "back leg defective, do not use."

Figure 2:
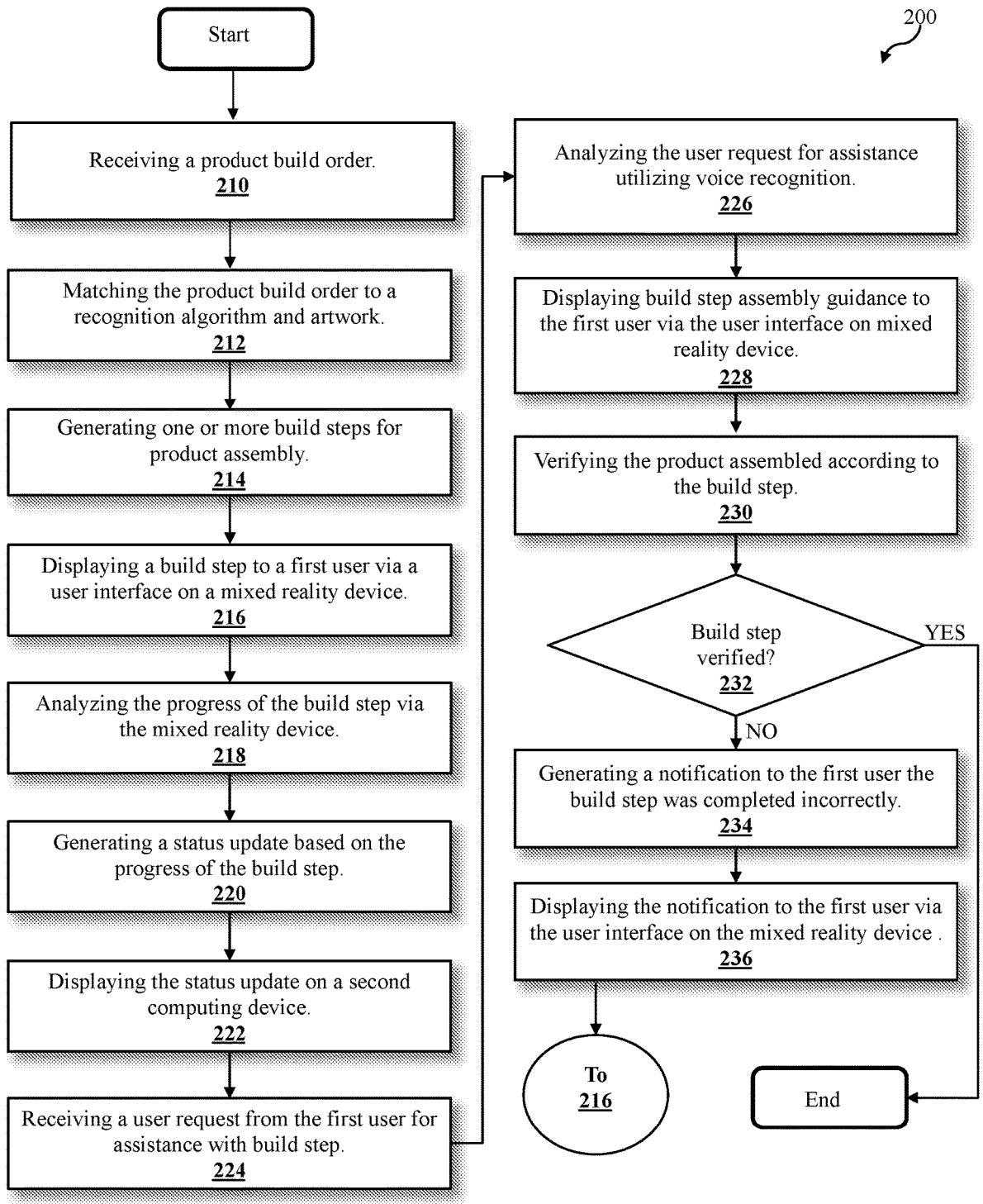
FIG. 2 is a flowchart illustrating an example method of product build assistance and verification in accordance with an embodiment of the invention.

Referring to FIG. 2, a method 200 for product build assistance and verification is depicted, in accordance with an embodiment of the present invention.

Referring to block 210, the product build assistance and verification program 126 receives a product build order. Receipt of a product build order is described in more detail above with reference to the product build instruction module 151 of FIG. 1b.

Referring to block 212, the product build assistance and verification program 126 matches the product build order to recognition algorithms and artwork. Algorithm and artwork matching is described in more detail above with reference to the algorithm and artwork matching module 152 of FIG. 1b.

Referring to block 214, the product build assistance and verification program 126 generates a list of build steps for the product. Generation of product build steps is described in more detail above with reference to the build step generation module 154 of FIG. 1b.

Referring to block 216, the product build assistance and verification program 126 displays each build step to a first user on the mixed reality device 130 via the user interface 132. Build step display is described in more detail above with reference to the build step display module 156 of FIG. 1b.

Referring to block 218, the product build assistance and verification program 126 analyzes the build step progress. Build step progress analysis is described in more detail above with reference to the product build status module 158 of FIG. 1b.

Referring to block 220, the product build assistance and verification program 126 generates a status update of the product build. Status update generation is described in more detail above with reference to the product build status module 158 of FIG. 1b.

Referring to block 222, the product build assistance and verification program 126 displays the status update on the user device 140 via the supervisory user interface 142. Status update display is described in more detail above with reference to the product build status module 158 of FIG. 1b.

Referring to block 224, the product build assistance and verification program 126 receives a user request for assistance with a build step via the mixed reality device 130.

Receipt of a user request for assistance is described in more detail above with reference to the product build assistance module 160 of FIG. 1b.

Referring to block 226, the product build assistance and verification program 126 analyzes the user request for assistance with a build step. Analysis of a user request for assistance is described in more detail above with reference to the product build assistance module 160 of FIG. 1b.

Referring to block 228, the product build assistance and verification program 126 displays build step assembly guidance to the user of the mixed reality device 130 via the user interface 132. Display of build step assembly guidance in response to a user request for assistance is described in more detail above with reference to the product build assistance module 160 of FIG. 1b.

Referring to block 230, the product build assistance and verification program 126 verifies the product is assembled according to the build step via the mixed reality device 130. Product assembly verification is described in more detail above with reference to the build step verification module 162 of FIG. 1b. If the product build assistance and verification program 126 verifiers that the build step was completed correctly at block 232, the product build assistance and verification program 126 may terminate. If the product build assistance and verification program 126 determines that the build step was completed incorrectly at block 232, the product build assistance and verification program 126 may proceed to generate a notification to the user that the build step has been completed incorrectly at block 234. Notification generation is described in more detail above with reference to the build step feedback module 164 of FIG. 1b.

Referring to block 236, the product build assistance and verification program 126 displays the notification to the user via the user interface 132 on the mixed reality device 130. Notification display is described in more detail above with reference to the build step feedback module 164 of FIG. 1b.

While the method 200 illustrates the process for a single build step, it can be appreciated that a product assembly may comprise more than one build steps. Thus, the product build assistance and verification program 126 may repeat blocks 216-236 for as many build steps that are generated at block 214 for the product assembly. Further, each build step in a multiple build step product assembly may be completed by a unique user or a single user may complete two or more of the build steps.

Figure 3:
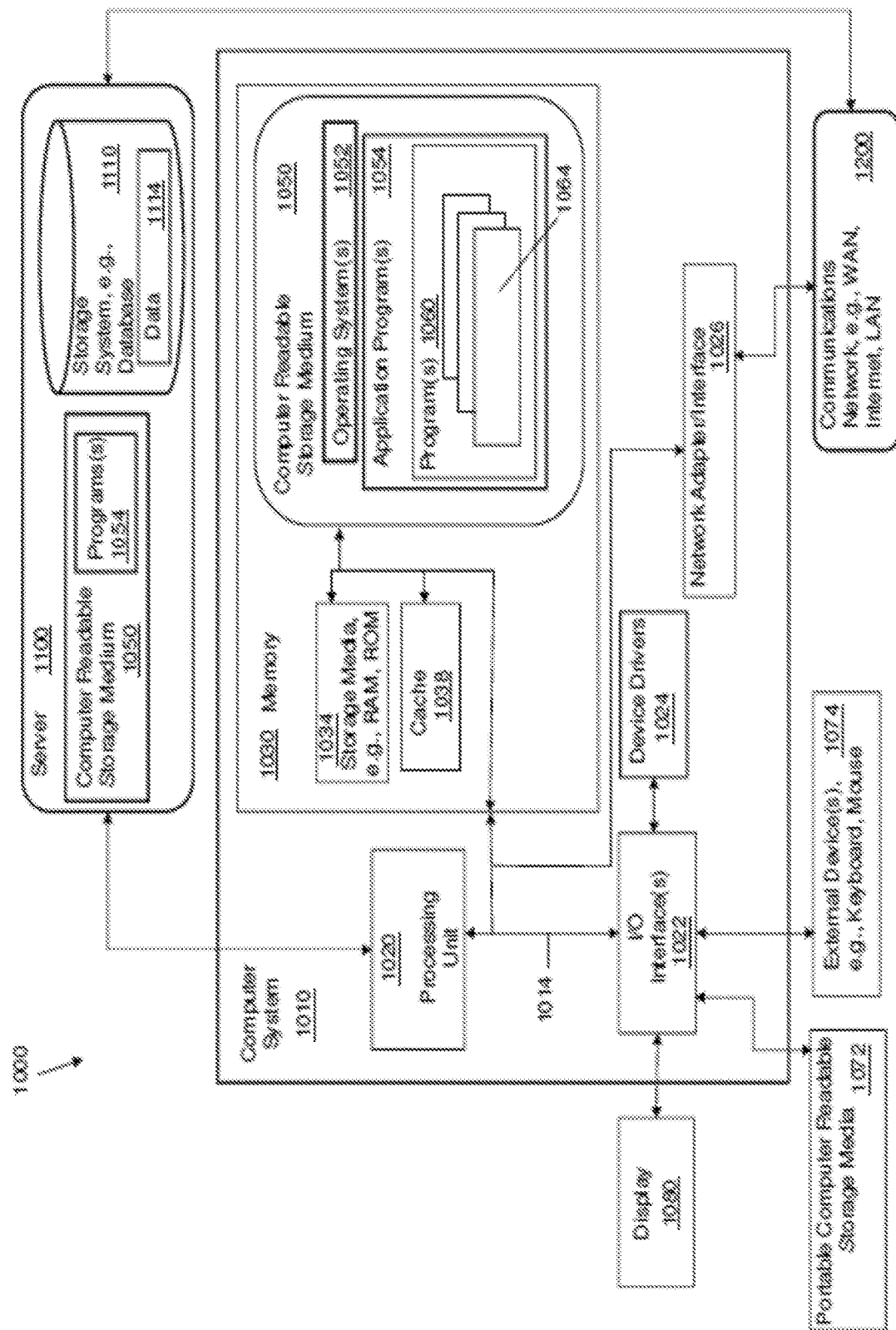
FIG. 3 is a block diagram depicting the hardware components of the product build assistance and verification system of FIG. 1, in accordance with an embodiment of the invention.

Referring to FIG. 3, a system 1000 includes a computer system or computer 1010 shown in the form of a generic computing device. The method 200 for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention. As such, the computing device in FIG. 3 becomes specifically configured to implement mechanisms of the illustrative embodiments and specifically configured to perform the operations and generated the outputs of described herein for determining a route based on a user's preferred environmental experiences.

The method 200 (FIG. 2), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. For example, the program modules 1064 can include the modules 151-164 described above with reference to FIG. 1b. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
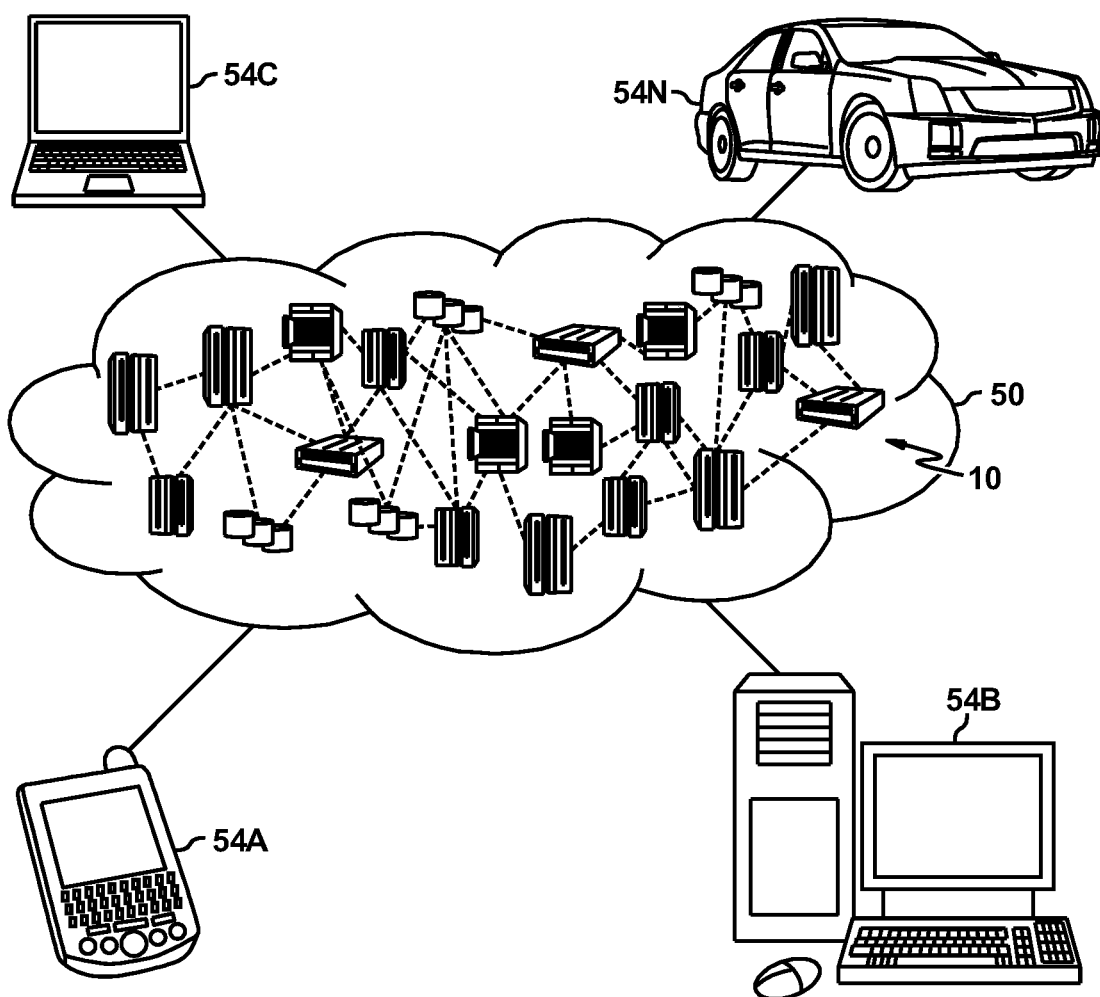
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
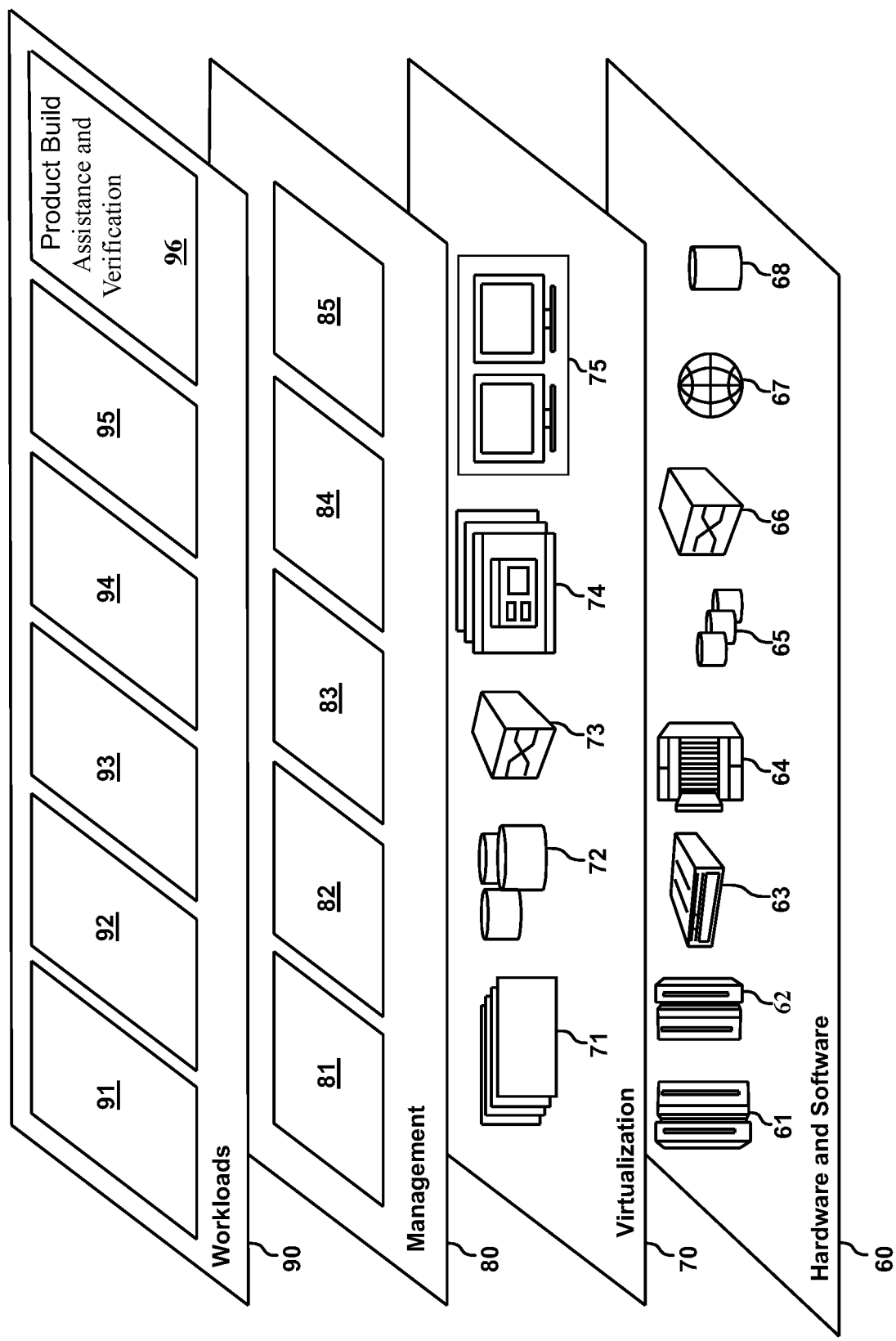
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and product build assistance and verification 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for image product build assistance and verification, the method comprising:
   receiving, by a first computing device, a product build order for a product;
   matching, by the first computing device, the product build order to one or more recognition algorithms and one or more pieces of product artwork;
   generating, by the first computing device, one or more build steps for product assembly;
   displaying, by the first computing device, a build step to a first user via a user interface on a mixed reality device;
   analyzing, by the first computing device, progress of the build step via the mixed reality device;
   generating, by the first computing device, a product build status update based on the progress of the build step, the product build status update including progression analytics wherein the product build status update also includes an identification of the first user and the build step assigned to the first user; and
   displaying, by the first computing device, the status update to a second user on a second computing device.

2. A method as in claim 1, further comprising:
   receiving, by the first computing device, a user request from the first user for assistance with the build step, the user request being generated via audio input to the mixed reality device;
   analyzing, by the first computing device, the user request for assistance utilizing voice recognition; and
   displaying, by the first computing device, build step assembly guidance to the first user via the user interface on the mixed reality device.

3. The method as in claim 1, further comprising:
   verifying, by the first computing device, the product is correctly assembled according to the build step;
   in response to verifying the product is not correctly assembled according to the build step, generating, by the first computing device, a notification to the first user, the notification indicating the build step was completed incorrectly.

4. The method as in claim 3, wherein verifying, by the first computing device, the product is correctly assembled according to the build step, further comprises:
   capturing, by the mixed reality glasses, one or more images of the product being built, and
   comparing, by the first computing device, the captured one or more images to the one or more pieces of product artwork utilizing the one or more recognition algorithms.

5. The method as in claim 4, wherein the one or more images are captured continuously by the mixed reality device.

6. The method as in claim 1, wherein the mixed reality device is mixed reality glasses worn by the first user.

7. The method as in claim 1, wherein the product build status update including progression analytics further comprises at least one of the group consisting of: percentage completion for the one or more product build steps, percentage completion for the product build order, time taken for each product build step, time taken for complete product order build, percentage overall product order completion status, and time take for overall product order completion status, and individual worker productivity metrics.

8. The method as in claim 1, wherein analyzing, by the first computing device, progress of the build step via the mixed reality device, further comprises:
   capturing, by the mixed reality device, one or more images of the product being built, and
   comparing, by the first computing device, the captured one or more images to the one or more pieces of product artwork utilizing the one or more recognition algorithms.

9. The method as in claim 2, wherein the build step assembly guidance comprises at least one of the group consisting of: a virtual connection to an expert, detailed animated instructions of how to complete the build step, a video of how to complete the build step, and detailed written instructions on how to complete the build step.

10. A computer program product for product build assistance and verification, the computer program product comprising:
   a computer-readable storage medium having program instructions embodied therewith, wherein the computer readable storage medium is not a transitory signal per se, the program instructions comprising:
   program instructions to receive, by a first computing device, a product build order for a product;
   program instructions to match, by the first computing device, the product build order to one or more recognition algorithms and one or more pieces of product artwork;
   program instructions to generate, by the first computing device, one or more build steps for product assembly;
   program instructions to display, by the first computing device, a build step to a first user via a user interface on a mixed reality device;
   program instructions to analyze, by the first computing device, progress of the build step via the mixed reality device;
   program instructions to generate, by the first computing device, a product build status update based on the progress of the build step, the product build status update including progression analytics, wherein the product build status update also includes an identification of the first user and the build step assigned to the first user; and
   program instructions to display, by the first computing device, the status update to a second user on a second computing device.

11. A computer program product as in claim 10, further comprising:
   program instructions to receive, by the first computing device, a user request from the first user for assistance with the build step, the user request being generated via audio input to the mixed reality device;
   program instructions to analyze, by the first computing device, the user request for assistance utilizing voice recognition; and
   program instructions to display, by the first computing device, build step assembly guidance to the first user via the user interface on the mixed reality device.

12. The computer program product as in claim 11, wherein the build step assembly guidance comprises at least one of the group consisting of: a virtual connection to an expert, detailed animated instructions of how to complete the build step, a video of how to complete the build step, and detailed written instructions on how to complete the build step.

13. The computer program product as in claim 10, further comprising:
program instructions to verifying, by the first computing device, the product is correctly assembled according to the build step;
in response to verifying the product is not correctly assembled according to the build step, program instructions to generate, by the first computing device, a notification to the first user, the notification indicating the build step was completed incorrectly.

14. The computer program product as in claim 10, wherein the program instructions to analyze, by the first computing device, progress of the build step via the mixed reality device, further comprises:
program instructions to capture, by the mixed reality device, one or more images of the product being built, and
program instructions to compare, by the first computing device, the captured one or more images to the one or more pieces of product artwork utilizing the one or more recognition algorithms.

15. A computer system for product build assistance and verification, the system comprising:
one or more computer processors, one or more computer-readable storage media, and program instructions stored on one or more of the computer-readable storage media for execution by at least one of the one or more processors, the program instructions comprising:
program instructions to receive, by a first computing device, a product build order for a product;
program instructions to match, by the first computing device, the product build order to one or more recognition algorithms and one or more pieces of product artwork;
program instructions to generate, by the first computing device, one or more build steps for product assembly;
program instructions to display, by the first computing device, a build step to a first user via a user interface on a mixed reality device;
program instructions to analyze, by the first computing device, progress of the build step via the mixed reality device;
program instructions to generate, by the first computing device, a product build status update based on the progress of the build step, the product build status update including progression analytics, wherein the product build status update also includes an identification of the first user and the build step assigned to the first user; and
program instructions to display, by the first computing device, the status update to a second user on a second computing device.

16. A computer system as in claim 15, further comprising:
program instructions to receive, by the first computing device, a user request from the first user for assistance with the build step, the user request being generated via audio input to the mixed reality device;
program instructions to analyze, by the first computing device, the user request for assistance utilizing voice recognition; and
program instructions to display, by the first computing device, build step assembly guidance to the first user via the user interface on the mixed reality device.

17. The computer system as in claim 16, wherein the build step assembly guidance comprises at least one of the group consisting of: a virtual connection to an expert, detailed animated instructions of how to complete the build step, a video of how to complete the build step, and detailed written instructions on how to complete the build step.

18. The computer system as in claim 15, further comprising:
program instructions to verifying, by the first computing device, the product is correctly assembled according to the build step;
in response to verifying the product is not correctly assembled according to the build step, program instructions to generate, by the first computing device, a notification to the first user, the notification indicating the build step was completed incorrectly.

19. The computer system as in claim 15, wherein the mixed reality device is mixed reality glasses worn by the first user.

20. The computer system as in claim 15, wherein the program instructions to analyze, by the first computing device, progress of the build step via the mixed reality device, further comprises:
program instructions to capture, by the mixed reality device, one or more images of the product being built, and
program instructions to compare, by the first computing device, the captured one or more images to the one or more pieces of product artwork utilizing the one or more recognition algorithms.

* * * * *